United States Patent
Zhan et al.

(10) Patent No.: US 11,448,168 B2
(45) Date of Patent: Sep. 20, 2022

(54) EXHAUST GAS RECIRCULATION SYSTEM AND ENGINE

(71) Applicant: WEICHAI POWER CO., LTD., Shandong (CN)

(72) Inventors: Qiang Zhan, Weifang (CN); Guoliang Chu, Weifang (CN)

(73) Assignee: WEICHAI POWER CO., LTD., Weifang (CN)

( * ) Notice: Subject to any disclaimer, the term of this patent is extended or adjusted under 35 U.S.C. 154(b) by 0 days.

(21) Appl. No.: 17/287,945

(22) PCT Filed: Dec. 28, 2018

(86) PCT No.: PCT/CN2018/124697
§ 371 (c)(1),
(2) Date: Apr. 22, 2021

(87) PCT Pub. No.: WO2020/133162
PCT Pub. Date: Jul. 2, 2020

(65) Prior Publication Data
US 2021/0404423 A1    Dec. 30, 2021

(51) Int. Cl.
*F02M 26/02* (2016.01)
*F02M 26/14* (2016.01)
(Continued)

(52) U.S. Cl.
CPC .............. *F02M 26/02* (2016.02); *F01N 13/10* (2013.01); *F02M 26/14* (2016.02); *F02M 26/17* (2016.02);
(Continued)

(58) Field of Classification Search
CPC ........ F02M 26/02; F02M 26/14; F02M 26/17; F02M 26/22; F02M 26/35; F02M 26/05;
(Continued)

(56) References Cited

U.S. PATENT DOCUMENTS

| 5,791,146 A | 8/1998 | Dungner |
| 5,794,445 A * | 8/1998 | Dungner ................ F02M 26/42 60/605.2 |

(Continued)

FOREIGN PATENT DOCUMENTS

| CN | 201513258 U | 6/2010 |
| CN | 104791148 A | 7/2015 |

(Continued)

OTHER PUBLICATIONS

PCT International Search Report and Written Opinion, PCT/CN2018/124697, dated Oct. 12, 2019, 11 pgs.

(Continued)

*Primary Examiner* — Audrey B. Walter
*Assistant Examiner* — Dapinder Singh
(74) *Attorney, Agent, or Firm* — Fenwick & West LLP

(57) ABSTRACT

An exhaust gas recirculation system includes a first turbocharger and a second turbocharger connected in series. An outlet of a turbine of the second turbocharger is connected to an exhaust pipe. An inlet of a compressor of the second turbocharger is connected to the exhaust pipe by means of an EGR gas collection pipe, and an outlet of the compressor of the second turbocharger is connected to an intake manifold by means of a low-pressure EGR exhaust pipe. The system employs energy of exhaust gas to drive turbines of a two-stage turbocharging system, thereby increasing utilization of the exhaust gas and improving the economic efficiency of an engine. An engine is also disclosed.

19 Claims, 7 Drawing Sheets

(51) Int. Cl.
  *F01N 13/10*    (2010.01)
  *F02M 31/20*    (2006.01)
  *F02M 35/10*    (2006.01)
  *F02M 26/17*    (2016.01)
  *F02M 26/22*    (2016.01)
  *F02M 26/35*    (2016.01)

(52) U.S. Cl.
  CPC ............ *F02M 26/22* (2016.02); *F02M 26/35* (2016.02); *F02M 31/20* (2013.01); *F02M 35/10157* (2013.01); *F02M 35/10222* (2013.01)

(58) Field of Classification Search
  CPC ........ F02M 26/34; F02M 26/08; F02M 31/20; F02M 35/10157; F02M 35/10222; F01N 13/10
  See application file for complete search history.

(56) References Cited

U.S. PATENT DOCUMENTS

| | | | | |
|---|---|---|---|---|
| 6,237,335 | B1* | 5/2001 | Lonnqvist | ............ F02M 26/34 60/605.2 |
| 2005/0056017 | A1* | 3/2005 | Sisken | ................. F02M 26/35 60/311 |
| 2007/0119171 | A1 | 5/2007 | Boyapati et al. | |
| 2011/0094486 | A1 | 4/2011 | Vuk | |
| 2011/0209473 | A1 | 9/2011 | Fritz et al. | |
| 2016/0290218 | A1 | 10/2016 | Smiljanovski et al. | |
| 2016/0312687 | A1 | 10/2016 | Kemmerling et al. | |
| 2018/0119589 | A1* | 5/2018 | Chandler | ................. F01N 3/035 |

FOREIGN PATENT DOCUMENTS

| | | |
|---|---|---|
| CN | 204783248 U | 11/2015 |
| CN | 106050402 A | 10/2016 |
| CN | 106065809 A | 11/2016 |
| CN | 107905920 A | 4/2018 |
| EP | 2196659 A1 | 6/2010 |
| JP | H1162715 A | 3/1999 |
| JP | 2008-261294 A | 10/2008 |

OTHER PUBLICATIONS

First Office Action, China National Intellectual Property Administration Patent Application No. 201880100524.4, dated Mar. 23, 2022, 12 pages.

Extended European Search Report, European Patent Office Application No. 18945077.8, dated Jul. 4, 2022, 8 pages.

* cited by examiner

EXHAUST GAS RECIRCULATION SYSTEM AND ENGINE

The present application is a 35 U.S.C. 371 Patent Application of PCT Application No. PCT/CN2018/124697, filed on Dec. 28, 2018, which is incorporated herein by reference in its entirety.

FIELD

The present application relates to the technical field of engine EGR, in particular to an exhaust gas recirculation system and an engine.

BACKGROUND

Exhaust gas recirculation (EGR) is one of the most effective means for a modern diesel engine to reduce $NO_x$ emission. EGR can reduce the oxygen concentration and the maximum combustion temperature in a cylinder, thereby achieving the effect of reducing $NO_x$. EGR is considered to be one of the important technical means for the diesel engine to meet national IV regulation and later emission regulations.

In an existing EGR system, as shown in FIG. 1, an exhaust manifold 03 of an engine 01 is connected with a turbine 06 of a turbocharger, an exhaust pipe 07 is connected after the turbine 06, one end of an EGR pipe 010 takes air before the turbine 06, the other end of the EGR pipe 010 is connected to an intake manifold 02 of the engine 01. An EGR valve 04 is provided on the EGR pipe, an inlet of a compressor 05 of the turbocharger is connected with an intake pipe 08, and an outlet of the compressor 05 is in communication with the intake manifold 02. While the EGR valve is opened, part of exhaust gas enters the turbine 05 to supercharge the intake air, and the remaining exhaust gas passes through the EGR valve 04 and an EGR cooler 011, mixes with the supercharged air and enters the intake manifold 02 of the engine 01. Due to the increase in the efficiency of the turbocharger, the supercharged intake pressure may be higher than the exhaust pressure before a turbo in a considerable speed range. It is difficult to obtain a sufficient EGR rate simply by opening the EGR valve. In order to obtain a sufficiently large and adjustable EGR rate and reduce $NO_x$, the common method is to provide an intake throttle valve 09 on the intake pipe. The EGR exhaust gas is mixed with the supercharged air downstream of the intake throttle valve 09. However, the intake throttle valve 09 may significantly increase the pumping loss while increasing the EGR rate, which causes the engine fuel consumption to be increased, the particulate matter emission to be increased, and the economy to be deteriorated.

SUMMARY

In view of this, a first object of the present application is to provide an exhaust gas recirculation system to increase the EGR rate while avoiding pumping loss, increased engine fuel consumption, increased particulate matter emission, and improve economy of an engine. A second object of the present application is to provide an engine including the above exhaust gas recirculation system.

In order to achieve the above objects, the following technical solutions are provided according to the present application.

An exhaust gas recirculation system includes a first turbocharger and a second turbocharger. A turbine of the first turbocharger and a turbine of the second turbocharger are connected in series to an exhaust manifold of an engine, an outlet of the turbine of the second turbocharger is connected to an exhaust pipe, an inlet of a compressor of the first turbocharger is connected to an intake pipe, an outlet of the compressor of the first turbocharger is in communication with an intake manifold of the engine, an inlet of a compressor of the second turbocharger is in communication with the exhaust manifold through a first EGR intake pipe, and an outlet of the compressor of the second turbocharger is in communication with the intake manifold through an EGR exhaust pipe.

Preferably, a pipeline between the turbine of the first turbocharger and the turbine of the second turbocharger is communicated with the exhaust pipe through a bypass pipe, and an exhaust gas control valve is provided on the bypass pipe.

Preferably, the inlet of the second turbocharger is in communication with the exhaust pipe through a second EGR intake pipe.

Preferably, an EGR filter is provided on at least one of the first EGR intake pipe and the second EGR intake pipe.

Preferably, an EGR filter is provided on the EGR exhaust pipe.

Preferably, an EGR cooler is provided on at least one of the first EGR intake pipe, the second EGR intake pipe and the EGR exhaust pipe.

Preferably, the outlet of the compressor of the first turbocharger is in communication with the intake manifold through an intercooler, and the EGR exhaust pipe and the intake manifold are connected downstream of the intercooler in an intake direction.

Preferably, the outlet of the compressor of the first turbocharger is communicated with the intake manifold through an intercooler, and the EGR exhaust pipe and the intake manifold are connected upstream of the intercooler in an intake direction.

Preferably, an EGR valve is provided on the EGR exhaust pipe.

An engine includes the exhaust gas recirculation system according to any one of the above.

In summary, the exhaust gas recirculation system is provided according to the present application, which includes the first turbocharger and the second turbocharger. After the turbine of the first turbocharger and the turbine of the second turbocharger are connected in series to the exhaust manifold of the engine, that is, an inlet of the turbine of the first turbocharger is in communication with the exhaust manifold, an outlet of the turbine of the first turbocharger is in communication with an inlet of the turbine of the second turbocharger, the inlet of the compressor of the first turbocharger is connected with the intake pipe, the outlet of the compressor of the first turbocharger is in communication with the intake manifold of the engine, the inlet of the compressor of the second turbocharger is in communication with the exhaust manifold through the first EGR intake pipe, and the outlet of the compressor of the second turbocharger is in communication with the intake manifold through the EGR exhaust pipe.

A two-stage turbocharger is used by the above exhaust gas recirculation system. In application, part of the exhaust gas discharged from the exhaust manifold is used by the first turbocharger to supercharge the fresh air, and then the exhaust gas enters the turbine of the second turbocharger to continue to recover the energy of the exhaust gas. Part of the exhaust gas taken from the exhaust manifold through the first EGR intake pipe in the compressor of the second turbocharger is supercharged, and the supercharged exhaust gas is mixed with the fresh air and passed into the exhaust manifold.

It can be seen that the energy of the exhaust gas is reused by the above exhaust gas recirculation system to drive the turbine of the two-stage turbocharger, which improves the utilization rate of the exhaust gas. The exhaust gas is supercharged by the second turbocharger, which is beneficial to increasing the EGR exhaust pressure, increasing the pressure difference between the exhaust and intake and the amount of the exhaust gas entering the engine, and increasing the EGR rate without adding an intake throttle valve, thereby avoiding pumping loss, increased engine fuel consumption, increased particulate matter emission while increasing the EGR rate, and improving economy of the engine.

An engine is further provided according to the present application, which includes the above exhaust gas recirculation system. Since the above exhaust gas recirculation system has the above technical effects, the engine with the exhaust gas recirculation system also has corresponding technical effects.

BRIEF DESCRIPTION OF THE DRAWINGS

For more clearly illustrating embodiments of the present application or the technical solutions in the conventional technology, drawings to be used in the description of the embodiments or the conventional technology will be briefly described hereinafter. Apparently, the drawings in the following description are only some embodiments of the present application. For those skilled in the art, other drawings may be obtained based on the provided drawings without any creative work.

Figure 1:
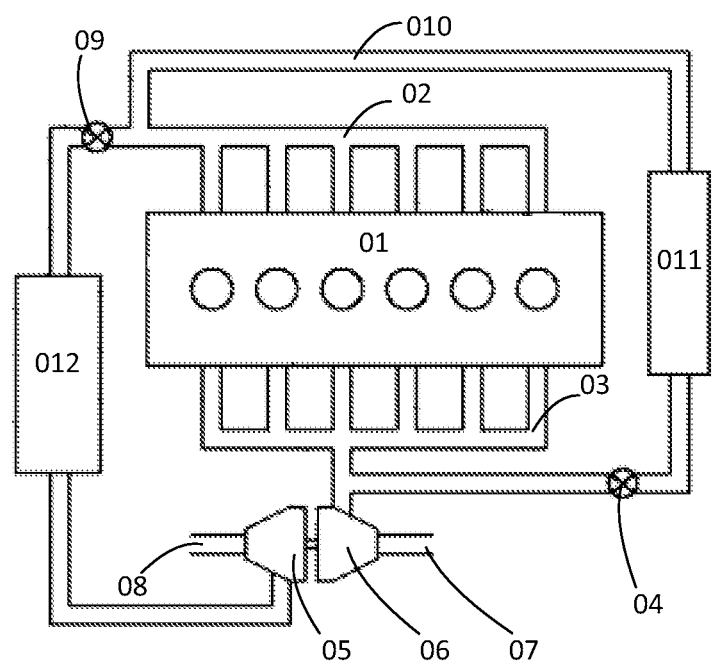
FIG. 1 is a schematic structural diagram of an exhaust gas recirculation system in the conventional technology.

| Reference numerals in FIG. 1: | |
|---|---|
| 01 engine; | 02 intake manifold; |
| 03 exhaust manifold; | 04 EGR valve; |
| 05 turbine; | 06 compressor; |
| 07 exhaust pipe; | 08 intake pipe; |
| 010 EGR pipe; | 011 EGR cooler; |
| 012 intercooler; | |

| Reference numerals in FIGS. 2 to 7: | |
|---|---|
| 1 engine; | 2 intake manifold; |
| 3 exhaust manifold; | 4 first EGR intake pipe; |
| 5 EGR exhaust pipe; | 6 second turbocharger; |
| 601 turbine of second turbocharger; | 602 compressor of second turbocharger; |
| 7 first turbocharger; | 701 turbine of first turbocharger; |
| 702 compressor of first turbocharger; | 8 intake pipe; |
| 9 exhaust pipe; | 10 intercooler; |
| 11 bypass pipe; | 12 exhaust gas control valve; |
| 13 second EGR intake pipe; | 14 EGR filter; |
| 15 EGR valve; | 16 EGR cooler. |

DETAILED DESCRIPTION OF THE EMBODIMENTS

The technical solutions according to the embodiments of the present application will be described clearly and completely as follows in conjunction with the drawings in the embodiments of the present application. It is apparent that the described embodiments are only a part of the embodiments according to the present application, rather than all of the embodiments. Based on the embodiments of the present application, all other obtained without creative efforts by those of the ordinary skill in the art shall fall within the protection scope of the present application.

Figure 2:
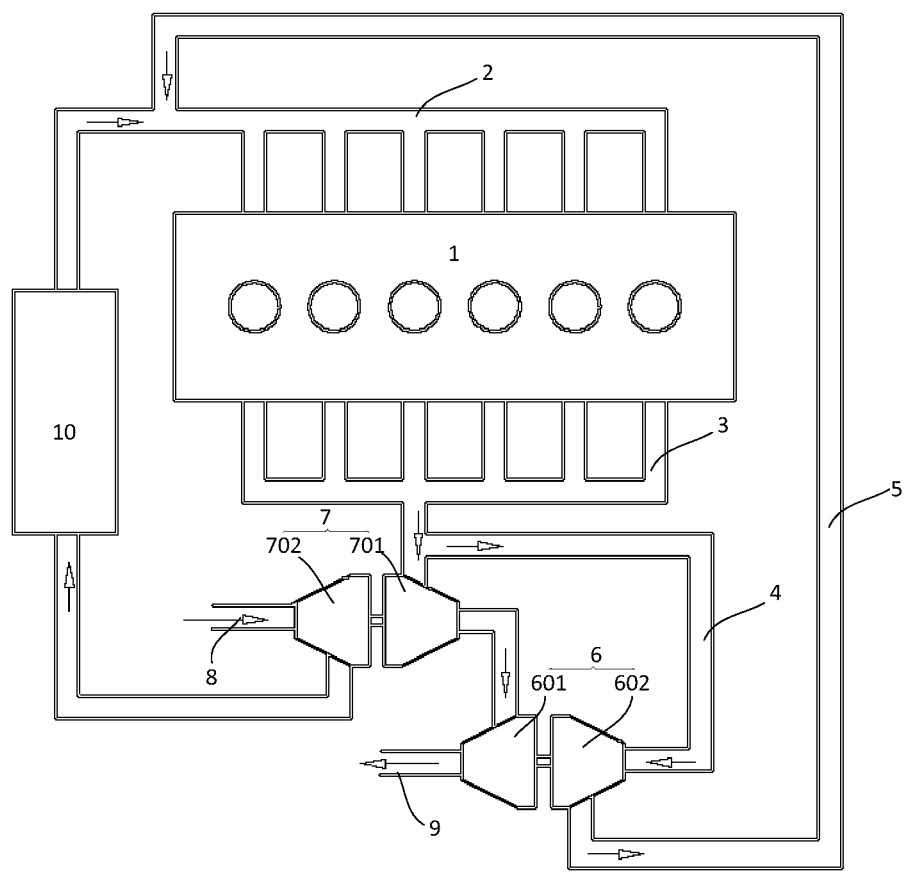
FIG. 2 is a schematic structural diagram of the exhaust gas recirculation system provided according to a first embodiment of the present application.

Referring to FIG. 2, FIG. 2 is a schematic structural diagram of an exhaust gas recirculation system provided according to a first embodiment of the present application.

An exhaust gas recirculation system provided according to an embodiment of the present application includes a first turbocharger 7 and a second turbocharger 6.

After a turbine 701 of the first turbocharger 7 and a turbine 601 of the second turbocharger 6 are connected in series to an exhaust manifold 3 of an engine 1, that is, an inlet of the turbine 701 of the first turbocharger 7 is in communication with the exhaust manifold 3, an outlet of the turbine 701 of the first turbocharger 7 is in communication with an inlet of the turbine 601 of the second turbocharger 6, an outlet of the turbine 601 of the second turbocharger 6 is in communication with an exhaust pipe 9, an inlet of a compressor 702 of the first turbocharger 7 is connected with an intake pipe 8, an outlet of the compressor 702 of the first turbocharger 7 is in communication with an intake manifold 2 of the engine 1, an inlet of a compressor 602 of the second turbocharger 6 is in communication with the exhaust manifold 3 through a first EGR intake pipe 4, and an outlet of the compressor 602 of the second turbocharger 6 is in communication with the intake manifold 2 through an EGR exhaust pipe 5.

In summary, compared with conventional technology, a two-stage turbocharger is used by the exhaust gas recirculation system provided according to the embodiment of the present application. In application, part of exhaust gas discharged from the exhaust manifold 3 is used by the first turbocharger 7 to supercharge the fresh air, and then the exhaust gas enters the turbine 601 of the second turbocharger 6 to continue to recover the energy of the exhaust gas. Part of the exhaust gas taken from the exhaust manifold 3 through the first EGR intake pipe 4 in the compressor 602 of the second turbocharger 6 is supercharged, and the supercharged exhaust gas is mixed with the fresh air and passed into the exhaust manifold 3. It can be seen that the energy of the exhaust gas is reused by the above exhaust gas recirculation system to drive the turbine of the two-stage turbocharger, which improves the utilization rate of the exhaust gas. The exhaust gas is supercharged by the second turbocharger 6, which is beneficial to increasing the EGR exhaust pressure, increasing the pressure difference between the exhaust and intake and the amount of the exhaust gas entering the engine 1, and improving the EGR rate without adding an intake throttle valve, thereby avoiding pumping loss, increased engine fuel consumption, increased particulate matter emission while increasing the EGR rate, and improving economy of the engine 1.

Preferably, a pipeline between the turbine 701 of the first turbocharger 7 and the turbine 601 of the second turbocharger 6 is in communication with an exhaust pipe 9 through a bypass pipe 11, and an exhaust gas control valve 12 is provided on the bypass pipe 11. If the EGR rate is insufficient in use, the exhaust gas control valve 12 is closed, the exhaust gas discharged from the turbine 701 of the first turbocharger 7 enters the turbine 601 of the second turbocharger 6 for supercharging the EGR exhaust gas. If the EGR rate is sufficient, the exhaust gas control valve 12 is opened, the exhaust gas is directly discharged without passing through the turbine 601 of the second turbocharger 6, so as to reduce the exhaust resistance.

The bypass pipe 11 may be in communication with the exhaust pipe 9, or may be in direct communication with the external environment.

Figure 4:
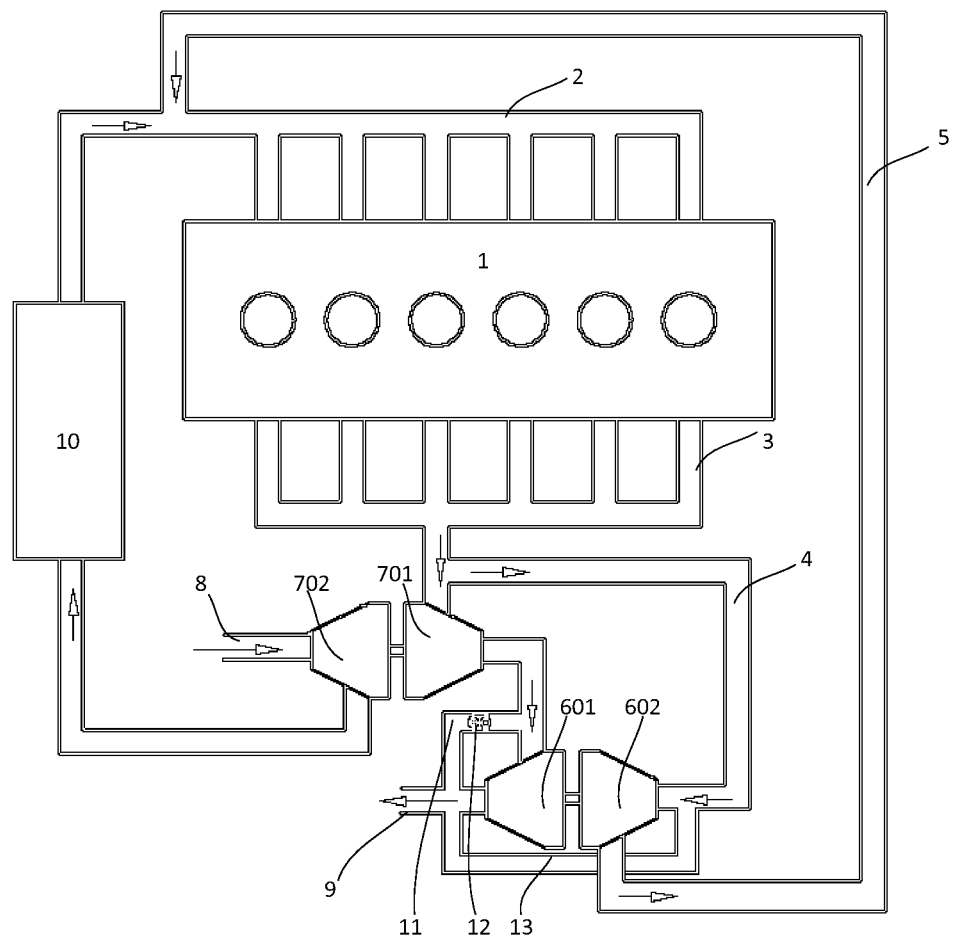
FIG. 4 is a schematic structural diagram of the exhaust gas recirculation system provided according to a third embodiment of the present application.

Taking the exhaust directly before the first turbocharger 7 may cause the efficiency of the first turbocharge to be decreased. For this reason, as shown in FIG. 4, an inlet of the second turbocharger 6 is in communication with the exhaust pipe 9 through a second EGR intake pipe 13. It can be understood that, in order to facilitate the control of the air intake amount from the first EGR intake pipe 4 and the second EGR intake pipe 13, an EGR valve 15 may be provided on the first EGR intake pipe 4 and the second EGR intake pipe 13 respectively. In application, the opening, closing and opening degree of the EGR valve are adjusted as required, which realizes the coordinated use of high-pressure EGR and low-pressure EGR.

Figure 5:
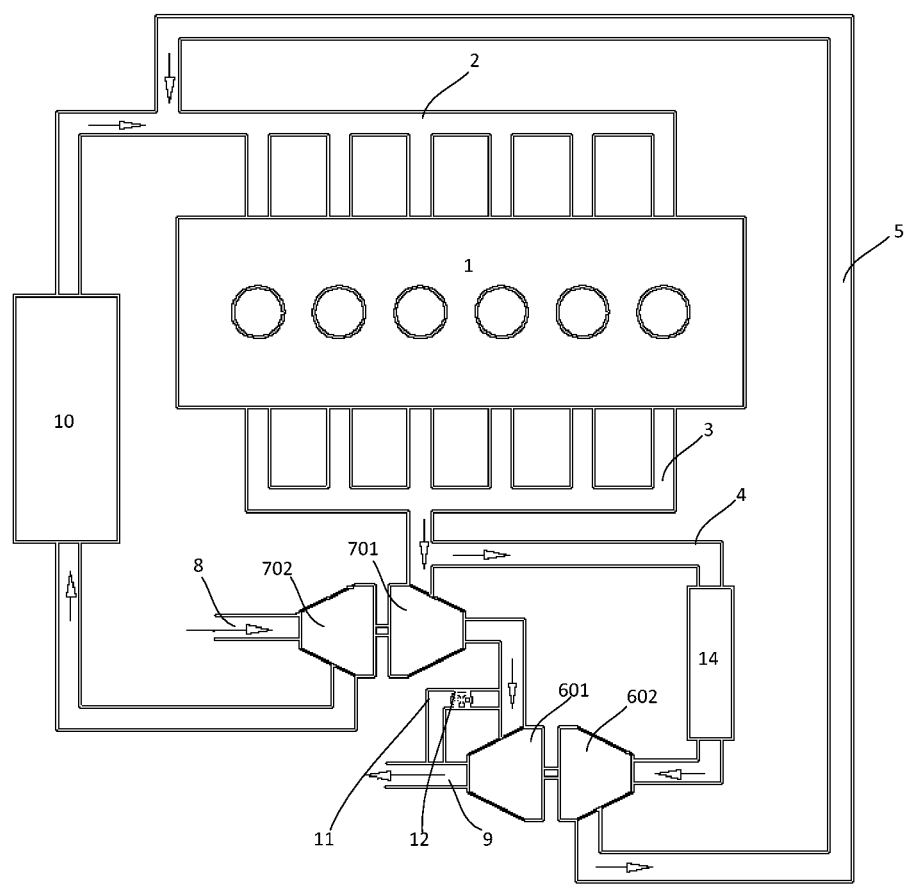
FIG. 5 is a schematic structural diagram of the exhaust gas recirculation system provided according to a fourth embodiment of the present application.

The exhaust gas may contain much particulate matter, and the particulate matter may cause damage to the engine 1. For this reason, in an embodiment of the present application, as shown in FIG. 5, an EGR filter 14 is provided on at least one of the first EGR intake pipe 4 and the second EGR intake pipe 13. Specifically, if the second EGR intake pipe 13 is connected to the first EGR intake pipe 4 and connected to the inlet of the compressor 602 of the second turbocharger 6 through the first EGR intake pipe 4, the EGR filter 14 may only be provided on the first EGR intake pipe 4 downstream of the connection between the first EGR intake pipe 4 and the second EGR intake pipe 13. Conversely, if the first EGR intake pipe 4 is connected to the second EGR intake pipe 13 and is connected to the inlet of the compressor 602 of the second turbocharger 6 through the second EGR intake pipe 13, the EGR filter 14 may only be provided on the second EGR intake pipe 13; if the first EGR intake pipe 4 and the second EGR intake pipe 13 are simultaneously connected to the inlet of the compressor 602 of the second turbocharger 6, it is better to provide the EGR filter 14 on the first EGR intake pipe 4 and the second EGR intake pipe 13 respectively.

In other embodiments, the EGR filter 14 may be provided at other positions, for example, the EGR filter 14 may be provided on the EGR exhaust pipe 5, or at the same time on the first EGR intake pipe 4, the second EGR intake pipe 13 and the EGR exhaust pipe 5, so as to improve the filtering effect and make the exhaust gas entering the engine 1 as clean as possible and further protect the engine 1.

In addition to a large amount of the particulate matter, the exhaust gas also has a high temperature. That the exhaust gas directly entering the engine 1 may cause an over high intake air temperature of the engine 1 and affect the performance of the engine 1. Therefore, a cooling device is required to be provided on the EGR pipe. For example, an EGR cooler 16 may be provided on at least one of the first EGR intake pipe 4, the second EGR intake pipe 13 and the EGR exhaust pipe 5. If one of the first EGR intake pipe 4 and the second EGR intake pipe 13 is connected to the compressor 602 of the second turbocharger 6 through the other of the first EGR intake pipe 4 and the second EGR intake pipe 13, the EGR cooler 16 may be provided in the one, which is directly connected to the compressor 602 of the second turbocharger 6, of the first EGR intake pipe 4 and the second EGR intake pipe 13, or the EGR cooler 16 may be provided on the EGR exhaust pipe 5.

In order to optimize the above technical solution, if the outlet of the compressor 702 of the first turbocharger 7 is communicated with the intake manifold 2 through an intercooler 10, and the EGR cooler 16 is provided on the EGR pipe, the EGR exhaust pipe 5 and the intake manifold 2 may be connected downstream of the intercooler 10 in an intake direction.

If the outlet of the compressor 702 of the first turbocharger 7 is communicated with the intake manifold 2 through an intercooler 10, but no EGR cooler 16 is provided on the EGR pipe, the EGR exhaust pipe 5 and the intake manifold 2 are connected upstream of the intercooler 10 in the intake direction, and the intercooler 10 is utilized to cool the EGR exhaust gas.

Figure 6:
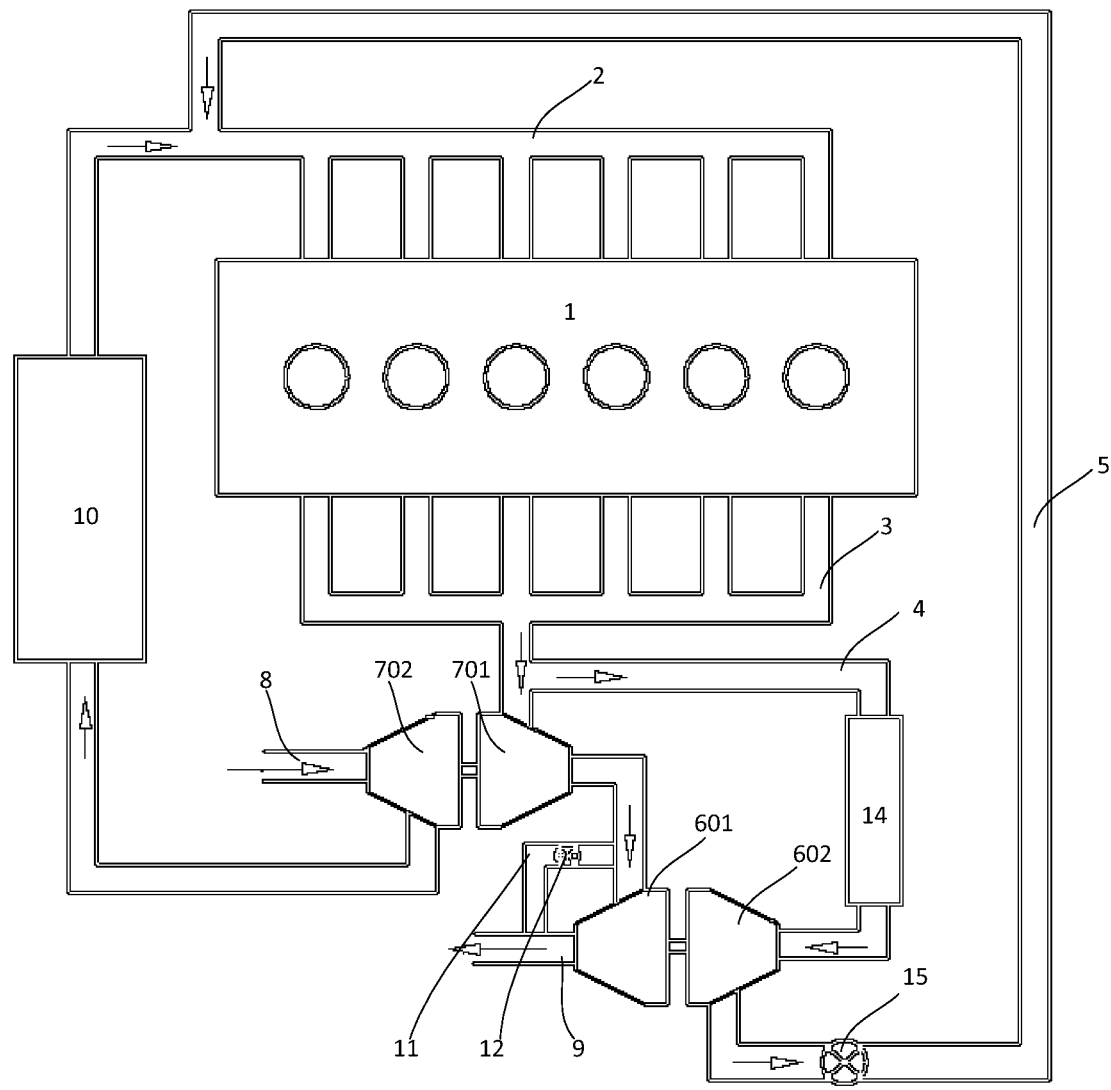
FIG. 6 is a schematic structural diagram of the exhaust gas recirculation system provided according to a fifth embodiment of the present application.

In order to facilitate the control of the EGR rate, in an embodiment of the present application, as shown in FIG. 6, an EGR valve 15 is provided on the EGR exhaust pipe 15. In other embodiments, the EGR valve 15 may be provided at other positions, such as the first intake pipe 4 and/or the second EGR intake pipe 13.

The embodiments of the present application will be further described below with reference to the accompanying drawings.

First Embodiment

Referring to FIG. 2, the inlet of the turbine 701 of the first turbocharger 7 is in communication with the exhaust manifold 3 of an engine 1, the outlet of the turbine 701 of the first turbocharger 7 is in communication with the inlet of the turbine 601 of the second turbocharger 6, the outlet of the turbine 601 of the second turbocharger 6 is connected to the exhaust pipe 9, the inlet of the compressor 702 of the first turbocharger 7 is connected to the intake pipe 8, the outlet of the compressor 702 of the first turbocharger 7 is in communication with the intake manifold 2 of the engine 1 through the intercooler 10, the inlet of a compressor 602 of the second turbocharger 6 is in communication with the exhaust manifold 3, the outlet of the compressor 602 of the second turbocharger 6 is in communication with the intake manifold 2.

In the above structure, part of exhaust gas discharged from the engine 1 first enters the turbine 701 of the first turbocharger 7 to supercharger the fresh air, and then enters the turbine 601 of the second turbocharger 6 to supercharge remaining exhaust gas in the exhaust manifold 3. The supercharged exhaust gas is mixed with the supercharged fresh air and then enters the intake manifold 2 of the engine 1. Through the above structure, the energy of the exhaust gas is reused, the utilization rate of the exhaust gas is increased, and the exhaust gas pressure is increased, which are beneficial to increasing the EGR exhaust gas flow and the EGR rate, reducing the emissions of the engine 1, and improving the economy of the engine 1.

Second Embodiment

Figure 3:
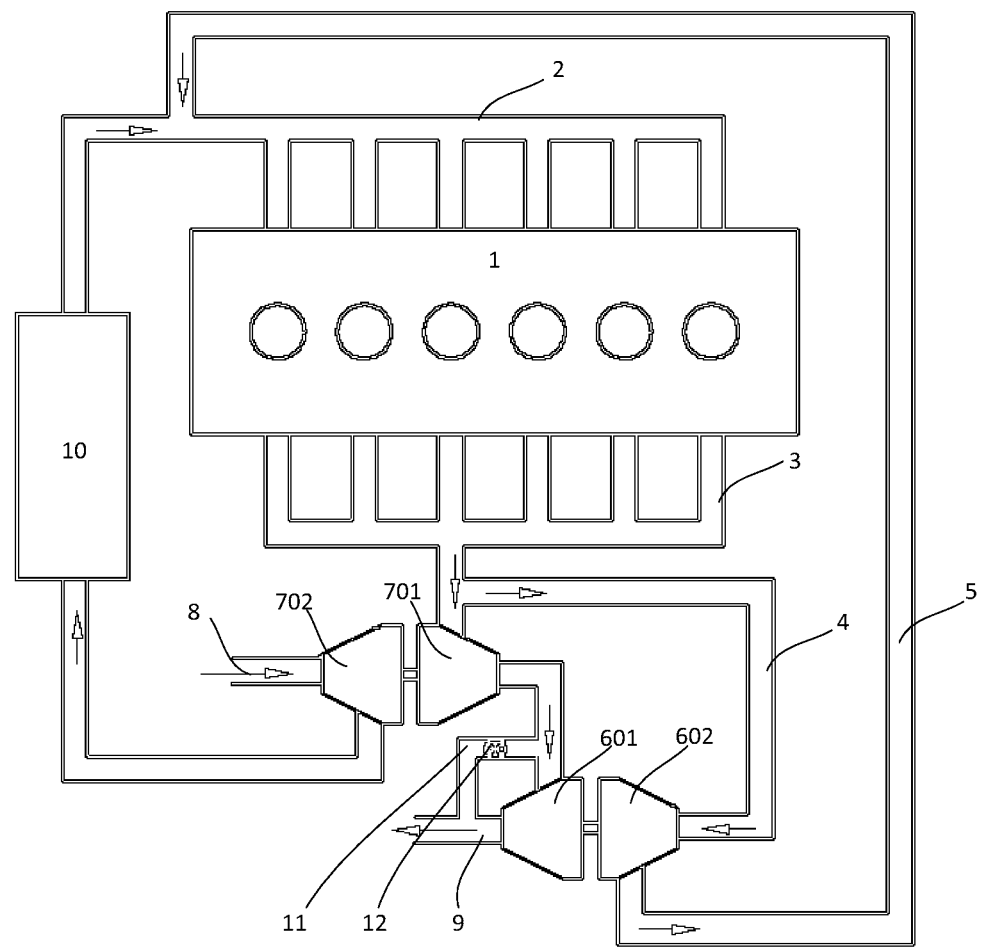
FIG. 3 is a schematic structural diagram of the exhaust gas recirculation system provided according to a second embodiment of the present application.

Referring to FIG. 3, the embodiment shown in FIG. 3 is based on the embodiment shown in FIG. 2 by adding a bypass pipe 11, one end of the bypass pipe 11 is connected to a communication pipe between the turbine 701 of the first turbocharger 7 and the turbine 601 of the second turbocharger 6, the other end of the bypass pipe 11 is in communication with the exhaust pipe 9, and an exhaust gas control valve 12 is provided on the bypass pipe 11, which provides one more choice for a user by providing the bypass pipe 11 and the exhaust gas control valve 12, that is, if the EGR rate is insufficient, the exhaust gas control valve 12 may be closed, so that the exhaust gas in the exhaust pipe enters the turbine 601 of the second turbocharger 6 for supercharging the exhaust gas in the EGR pipe, and the EGR exhaust gas is increased, thereby increasing the EGR rate. If the EGR rate is sufficient, the exhaust gas control valve 12 may be closed, so that the exhaust gas in the exhaust pipe is directly discharged without passing through the turbine 601 of the second turbocharger 6, thereby reducing the exhaust resistance.

Third Embodiment

Referring to FIG. 4, the embodiment shown in FIG. 4 is based on the embodiment in FIG. 3 by adding an second EGR intake pipe 13, one end of the second EGR intake pipe 13 is in communication with the exhaust pipe 9, the other end of the second EGR intake pipe 13 is in communication with the inlet of the compressor 602 of the second turbocharger 6, so that the first EGR intake pipe 4 can be used in conjunction with the second EGR intake pipe 13. The first EGR intake pipe 4 takes high-pressure exhaust gas before the turbocharger, and the second EGR intake pipe 13 takes low-pressure exhaust gas after the turbocharger, which can be controlled according to the requirements of the engine 1 to make the EGR system more efficient.

Fourth Embodiment

Referring to FIG. 5, the embodiment shown FIG. 5 is based on the embodiment shown in FIG. 3, the EGR filter 14 is provided on the first EGR intake pipe 4, and the EGR exhaust gas passes through the EGR filter 14 and is filtered before entering the compressor 602 of the second turbocharger 6. In other embodiments, the EGR filter 14 may be provided at other positions, such as the EGR exhaust pipe 5.

Fifth Embodiment

Referring to FIG. 6, the embodiment shown FIG. 6 is based on the embodiment shown in FIG. 3, an EGR valve 15 is provided on the EGR exhaust pipe 5, and the amount of the EGR exhaust gas is adjusted by adjusting the opening degree of the EGR valve 15, so as to achieve the purpose of controlling the EGR rate of the engine 1. In other embodiments, the EGR valve 15 may be provided on the first EGR intake pipe 4.

Sixth Embodiment

Figure 7:
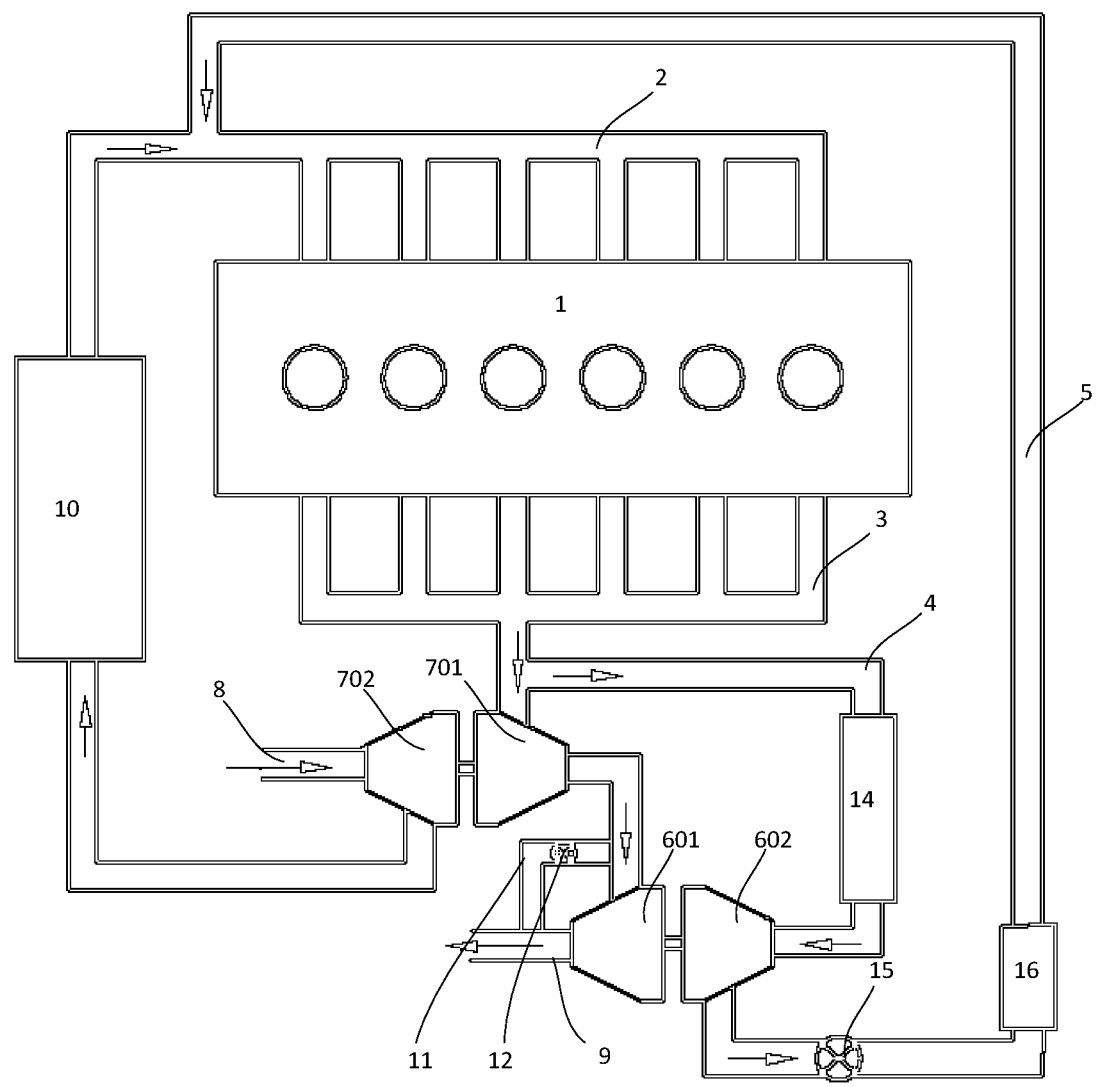
FIG. 7 is a schematic structural diagram of the exhaust gas recirculation system provided according to a sixth embodiment of the present application.

Since the exhaust gas in the first EGR intake pipe 4 directly comes from the exhaust manifold 3 and has a relatively high temperature. As shown in FIG. 7, the EGR cooler 16 is provided on the EGR exhaust pipe 5. Therefore, the EGR exhaust gas is cooled before the EGR exhaust gas enters the intake manifold 2, and the temperature of the EGR exhaust gas is decreased, thereby preventing the intake air temperature of the engine 1 from being too high.

Based on the exhaust gas recirculation system provided in the foregoing embodiment, an engine 11 is also provided according to the present application, which includes the exhaust gas recirculation system as described in any one of the above. Since the engine 11 utilizes the exhaust gas recirculation system in the above embodiment, the beneficial effects of the engine 11 may refer to the above embodiments.

The above embodiments are described in a progressive manner. Each of the embodiments is mainly focused on describing its differences from other embodiments, and reference may be made among these embodiments with respect to the same or similar parts.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. An exhaust gas recirculation system, comprising:
a first turbocharger, and
a second turbocharger,
wherein a turbine of the first turbocharger and a turbine of the second turbocharger are connected in series to an exhaust manifold of an engine, an outlet of the turbine of the second turbocharger is connected to an exhaust pipe, an inlet of a compressor of the first turbocharger is connected to an intake pipe, an outlet of the compressor of the first turbocharger is in communication with an intake manifold of the engine, an inlet of a compressor of the second turbocharger is in communication with the exhaust manifold through a first exhaust gas recirculation (EGR) intake pipe, and an outlet of the compressor of the second turbocharger is in communication with the intake manifold through an EGR exhaust pipe,
wherein the inlet of the second turbocharger is in communication with the exhaust pipe through a second EGR intake pipe.

2. The exhaust gas recirculation system according to claim 1, wherein a pipeline between the turbine of the first turbocharger and the turbine of the second turbocharger is in communication with the exhaust pipe through a bypass pipe, and an exhaust gas control valve is provided on the bypass pipe.

3. The exhaust gas recirculation system according to claim 2, wherein the inlet of the second turbocharger is in communication with the exhaust pipe through a second EGR intake pipe.

4. The exhaust gas recirculation system according to claim 2, wherein an EGR cooler is provided on at least one of the first EGR intake pipe, the second EGR intake pipe, or the EGR exhaust pipe.

5. The exhaust gas recirculation system according to claim 2, wherein the outlet of the compressor of the first turbocharger is in communication with the intake manifold through an intercooler, and the EGR exhaust pipe and the intake manifold are connected upstream of the intercooler in an intake direction.

6. The exhaust gas recirculation system according to claim 2, wherein an EGR valve is provided on the EGR exhaust pipe.

7. The exhaust gas recirculation system according to claim 1, wherein an EGR filter is provided on at least one of the first EGR intake pipe and the second EGR intake pipe.

8. The exhaust gas recirculation system according to claim 7, wherein an EGR cooler is provided on at least one of the first EGR intake pipe, the second EGR intake pipe, or the EGR exhaust pipe.

9. The exhaust gas recirculation system according to claim 7, wherein the outlet of the compressor of the first turbocharger is communicated with the intake manifold through an intercooler, and the EGR exhaust pipe and the intake manifold are connected upstream of the intercooler in an intake direction.

10. The exhaust gas recirculation system according to claim 7, wherein an EGR valve is provided on the EGR exhaust pipe.

11. The exhaust gas recirculation system according to claim 1, wherein an EGR filter is provided on the EGR exhaust pipe.

12. The exhaust gas recirculation system according to claim 11, wherein an EGR cooler is provided on at least one of the first EGR intake pipe, the second EGR intake pipe, or the EGR exhaust pipe.

13. The exhaust gas recirculation system according to claim 11, wherein the outlet of the compressor of the first turbocharger is in communication with the intake manifold through an intercooler, and the EGR exhaust pipe and the intake manifold are connected upstream of the intercooler in an intake direction.

14. The exhaust gas recirculation system according to claim 11, wherein an EGR valve is provided on the EGR exhaust pipe.

15. The exhaust gas recirculation system according to claim 1, wherein an EGR cooler is provided on at least one of the first EGR intake pipe, the second EGR intake pipe, or the EGR exhaust pipe.

16. The exhaust gas recirculation system according to claim 15, wherein the outlet of the compressor of the first turbocharger is in communication with the intake manifold through an intercooler, and the EGR exhaust pipe and the intake manifold are connected downstream of the intercooler in an intake direction.

17. The exhaust gas recirculation system according to claim 1, wherein the outlet of the compressor of the first turbocharger is communicated with the intake manifold through an intercooler, and the EGR exhaust pipe and the intake manifold are connected upstream of the intercooler in an intake direction.

18. The exhaust gas recirculation system according to claim 1, wherein an EGR valve is provided on the EGR exhaust pipe.

19. An engine, comprising the exhaust gas recirculation system according to claim 1.

* * * * *